> 2,777,751
> Patented Jan. 15, 1957

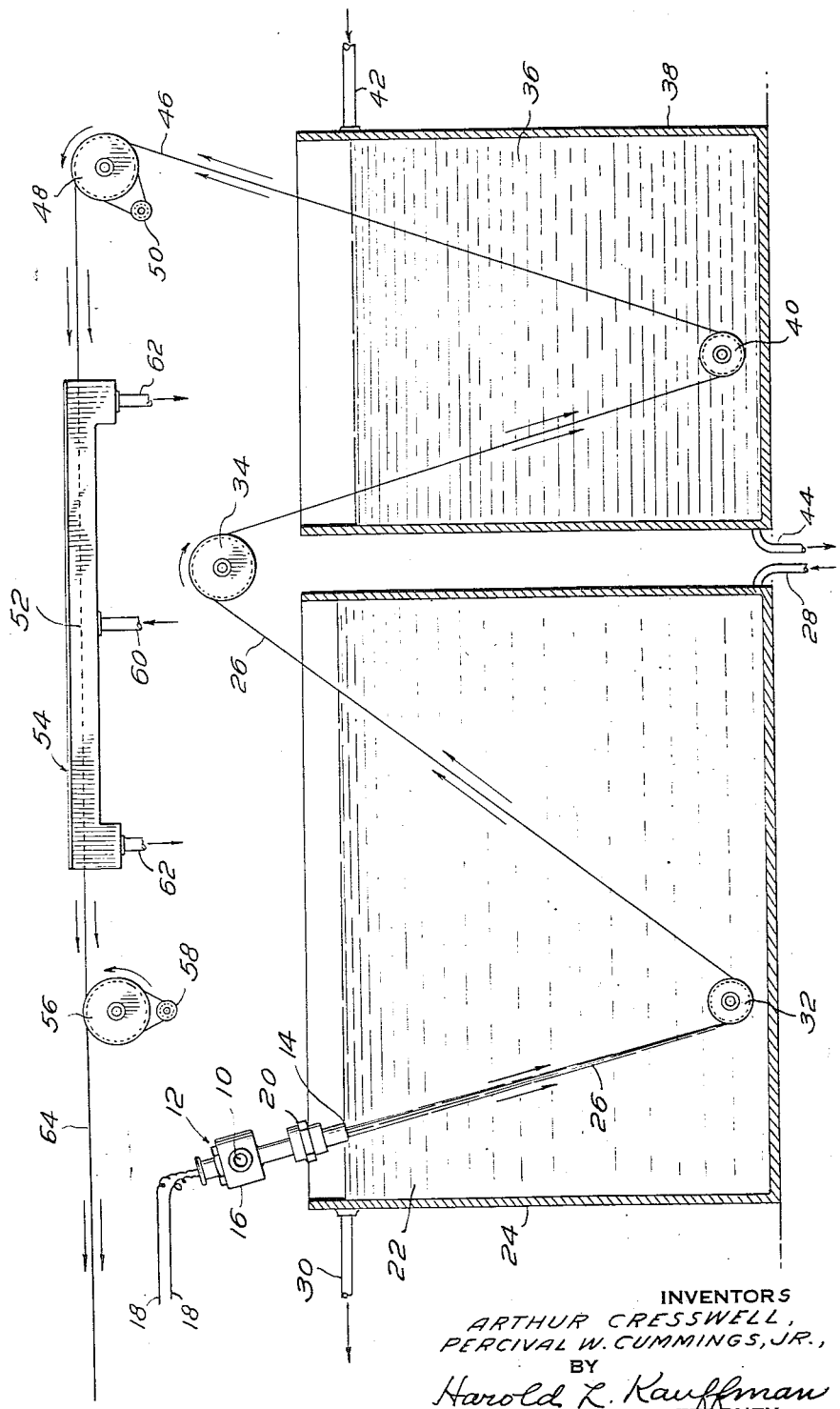

2,777,751

PROCESS FOR SPINNING AQUEOUS-SALINE SOLUTIONS OF ACRYLONITRILE POLYMERS

Arthur Cresswell, Stamford, and Percival W. Cummings, Jr., Cos Cob, Conn., assignors to American Cyanamid Company, New York, N. Y., a corporation of Maine Application March 8, 1951, Serial No. 214,616

11 Claims. (Cl. 18—54)

This invention relates to certain new and useful improvements in the art of producing synthetic fibers and other shaped structures (e. g., rods, tubes, bars, films, sheets, etc.), and more particularly to the art of producing such structures from an arcylonitrile polymerization product, especially such a polymerization product which contains a major proportion (that is, more than 50%) by weight of combined acrylonitrile. Still more particularly our invention is concerned with a method of forming shaped structures from an acrylonitrile polymerization product which comprises extruding an aqueous solution of an acrylonitrile polymerization product containing a major proportion (preferably at least 85%) by weight of combined acrylonitrile through a shaped orifice into a liquid coagulating bath containing from about 3% to about 25% (more particularly from about 5% to about 20%, specifically approximately 10%), by weight, of any of the water-soluble, organic or inorganic thiocyanates which yield highly hydrated ions in an aqueous solution (e. g., guanidine thiocyanate and substituted guanidine thiocyanates such as are disclosed in Cresswell Patent No. 2,533,224; sodium thiocyanate and the other alkali-metal thiocyanates; calcium, strontium, barium, zinc, tin, lead and other water-soluble metallic thiocyanates; etc.). The acrylonitrile polymerization product is dissolved in a concentrated aqueous solution of the same water-soluble thiocyanate which is a component of the aforementioned liquid coagulating bath, which bath, in all cases, is at a temperature not exceeding +10° C., advantageously not exceeding +5.° C. and preferably below 0° C., or at about 0° C. in some cases, e. g., from about —5° C. to 0° C.

The stretchable, gelled fiber or other shaped structure which is precipitated in the aforesaid liquid coagulating bath is then preferably washed by any suitable means until it is substantially free from thiocyanate. The washed, shaped structure, e. g., in fiber form, is then stretched in the presence of moisture and at a temperature within the range of about 70° C. to about 110° C.

Various methods of producing filaments, films and other shaped articles from polymeric acrylonitrile (homopolymeric acrylonitrile) and from copolymers or interpolymers of a major proportion of acrylonitrile and a minor proportion of another monomer or monomers heretofore have been suggested. For example, in Rein U. S. Patent No. 2,117,210 it is proposed that polyacrylonitrile be dissolved in a quaternary ammonium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metallic) salts, e. g., the chlorides, bromides, iodides, thiocyanates, perchlorates and nitrates, and that the resulting solutions be used in the manufacture of threads, films, etc. Various organic solvent solutions of polyacrylonitrile and copolymers of at least 85% by weight of acrylonitrile with another monomer are disclosed in U. S. Patents 2,404,713–728, and also the use of such solutions in forming films, filaments, etc., therefrom. In most of these latter patents the aforementioned Rein patents are referred to, as well as the difficulties encountered when effort was made to produce useful filaments and other shaped articles from polyacrylonitrile solutions of the kind proposed by Rein.

The invention disclosed and claimed in the copending application of one of us (Arthur Cresswell), Serial No. 772,200, filed September 4, 1947, now Patent No. 2,558,730, dated July 3, 1951, is based on the discovery that useful films, filaments, threads and other shaped articles can be produced from acrylonitrile polymerization products of the kind described therein and in the aforementioned patents, as well as hereinafter, by precipitating or coagulating the polymerization product in approximately its desired shape from a water-coagulable solution thereof, more particularly a concentrated aqueous salt solution of the kind disclosed by Rein in his Patent No. 2,140,921, the precipitation being effected by contacting the said solution with a cold aqueous coagulant, more particularly water alone, at a temperature not substantially exceeding +10° C. This coagulant is a non-solvent for the polymerization product but will dissolve the solvent in which the said product is dissolved. Surprisingly it was found that by keeping the temperature of the aqueous coagulating bath at or below +10° C., e. g., within the range of —15° C. to +10° C. and preferably at from about —15° C. to about +5° C., the precipitated gels in general are clear or substantially clear, tough, ductile and, in filament, thread or other form, can be stretched to orient the molecules, thereby increasing the cohesiveness, tensile strength, toughness, resilience and otherwise improving the properties of the finished product. In marked contrast, if temperatures materially above +10° C. be employed, e. g., temperatures of the order of 20° to 50° C. or higher, the precipitated gels in general are hazy or opaque, weak, friable, have little or no toughness or ductility and are not adapted for stretching to orient the molecules and thereby improve the properties of the dried material.

The present invention is an improvement upon the invention disclosed and claimed in the aforementioned copending Cresswell application Serial No. 772,200, and involves the use of a new and novel low-temperature liquid coagulating bath in a new and improved method of producing shaped articles, e. g., fibers, films, etc., from an acrylonitrile polymerization product dissolved in a concentrated aqueous solution of a water-soluble thiocyanate which yields highly hydrated ions in an aqueous solution, e. g., sodium or calcium thiocyanate, etc.

It is an object of the present invention to provide a coagulating bath and spinning process whereby the recovery of the solvent used in dissolving the acrylonitrile polymerization product will be more economical by reason of the fact that there will be less water to evaporate in producing a concentrated aqueous solution suitable for re-use as a solvent for the polymeric or copolymeric acrylonitrile.

Another object of the invention is to provide a more economical process, specifically by decreasing the amount of refrigeration required for cooling the liquid coagulant, since there is no make-up water that has to be refrigerated as is the case when water alone is used as the aqueous coagulant and a bath temperature of, for example, +0.5° C.

Still another object of the invention is to provide a new and novel liquid coagulating bath which can be effectively and economically used in a wet-spinning process and whereby bath temperatures below 0° C. can be readily obtained and maintained during the spinning operation.

Other objects of the invention will be apparent to those skilled in the art as the description of the invention proceeds.

The foregoing and other objects are attained by practicing the invention hereinafter described.

The novel features which are characteristic of our invention are set forth in the appended claims. The invention itself, however, will best be understood by reference to the following more detailed description when considered in connection with the accompanying drawing in which the single figure is a diagrammatic view of one form of apparatus that may be used in practicing the invention and which is illustrative thereof.

Polymeric acrylonitrile and acrylonitrile copolymers containing a major proportion by weight of combined acrylonitrile, preferably those containing in the molecules thereof an average of at least about 85% by weight of combined acrylonitrile, are used in practicing the present invention. These acrylonitrile polymerization products are prepared by methods well known to those skilled in the art. The polymeric and copolymeric acrylonitriles which are used in carrying our invention into effect may be of any suitable molecular weight, but ordinarily the molecular weight (average molecular weight) is within the range of 15,000 to 300,000 (more particularly from 35,000 to 300,000) or higher, and advantageously is within the range of about 50,000 to about 150,000, as calculated from viscosity measurements using the Staudinger equation (reference: U. S. Patent No. 2,404,713). The expression "acrylonitrile polymerization product containing a major proportion by weight of combined acrylonitrile" as used herein and in the appended claims, means a polymerization product (polymer, copolymer or interpolymer or mixture thereof) containing in its molecules a major or preponderant proportion (more than 50%) by weight, specifically an average of at least about 85% by weight, of the acrylonitrile unit, which is considered to be present in the individual polymer molecule as the group

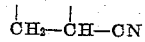

or, otherwise stated, a major proportion, more particularly at least about 85%, by weight, of the reactant substance converted into and forming the polymerization product is acrylonitrile (combined acrylonitrile).

Illustrative examples of monomers which can be co-polymerized or interpolymerized with acrylonitrile to yield a polymerization product (copolymer or interpolymer) containing in the polymer molecules a major proportion by weight of combined acrylonitrile are compounds containing a single $CH_2=C<$ grouping, for instance the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides and fluorides; allyl-type alcohols, e. g., allyl alcohol, methallyl alcohol and other unsaturated monohydric alcohols; allyl, methallyl and other unsaturated monohydric alcohol esters of monobasic acids, e. g., allyl and methallyl acetates, laurates, cyanides, etc.; acrylic and alacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also can be copolymerized with acrylonitrile to form copolymers which can be used in practicing the present invention. Examples of such esters are the dimethyl, -ethyl, -propyl, -butyl, etc., esters of maleic, fumaric, citraconic, etc., acids.

The spinning solution is prepared by dissolving the polymeric or copolymeric acrylonitrile in a concentrated aqueous solution of a water-soluble, organic or inorganic thiocyanate which yields highly hydrated ions in aqueous solution and which, mainly to simplify the recovery problem, is of the same kind used in the aqueous coagulating bath. Numerous examples of such salts have been given in the first paragraph of this specification. The concentration of the water-soluble thiocyanate in the water in all cases is sufficiently high so that the resulting solution will dissolve the acrylonitrile polymerization product. The concentration of thiocyanate in most cases is substantially above 40% (e. g., from 45–50% to 55–60%) of the total weight of the solution of thiocyanate dissolved in water, the upper limit being a saturated solution of the thiocyanate in water.

With reference to the drawing, a thiocyanate solution of polymeric or copolymeric acrylonitrile of the kind just described, which solution has been filtered (if necessary) and deaerated, is passed under pressure from a supply reservoir (not shown) through the conduit 10 into a spinneret coupling or heading 12, which preferably is designed so that the solution can be heated, e. g., by electrical or other means prior to extrusion through the spinneret 14. A suitable design of a spinneret coupling, which is heated by electrical means, is shown in Fig. 2 of the drawing accompanying the copending application of Arthur Cresswell, Serial No. 772,200, filed September 4, 1947. This spinneret assembly is broadly and specifically claimed in Cresswell's application Serial No. 205,778, filed January 12, 1951, as a division of the said application Serial No. 772,200 and now abandoned. Another suitable design of a spinneret assembly including a spinneret coupling provided with means for heating the spinning solution immediately prior to extrusion is disclosed and claimed in the copending application of Arthur Cresswell, Serial No. 201,823, filed December 20, 1950 and now abandoned.

The spinneret assembly illustrated in the drawing accompanying the present application is of the electrically heated kind such as is shown in Fig. 2 of the aforementioned Cresswell application Serial No. 772,200. The device comprises a male coupling 16 in which is annularly spaced an electrically heated cartridge provided with lead-in wires 18. This cartridge advantageously may be fitted in the male coupling 16 by means of a liquid-tight plug. The electrically heated cartridge is so positioned as to project beyond the lower end of the male coupling 16 and close to, or actually into, the cup of the spinneret 14, which is attached by female coupling 20. The solution being charged through the conduit 10 passes annularly between the outer wall of the cartridge and the inner wall of the male coupling 16 and thence through the spinneret 14.

From the foregoing description it will be seen that, in the preferred embodiment of the invention, the spinning solution is maintained at an elevated temperature immediately prior to extrusion. The temperature of the solution may be varied as desired or as conditions may require, but ordinarily will be within the range of 60° C. to 100° C. By heating the solution immediately prior to extrusion, its viscosity is materially reduced and a substantial reduction in operating pressure is effected. Furthermore, by increasing the fluidity of the solution at the point of extrusion, better operating conditions are attained since the higher temperature of the spinning solution facilitates the removal of the resulting water-swollen or gelled filaments from the face of the spinneret at a greater speed when other conditions are the same. In this way, the amount of fiber or yarn that can be produced from a particular unit is increased.

The spinneret coupling 12 may be held by any suitable means (not shown) above the liquid coagulating or precipitating bath 22 in vessel 24. The coupling preferably is positioned so that only the face of the spinneret contacts the coagulating bath.

The bath 22 comprises an aqueous solution containing from about 3% to about 25%, by weight, of a water-soluble thiocyanate which yields highly hydrated ions in an aqueous solution. Numerous examples of such thiocyanates have been given hereinbefore. We prefer to use an aqueous solution containing from about 3% to about 25%, by weight, of either sodium thiocyanate or calcium thiocyanate. From a practical standpoint and to simplify the recovery problem, it is desirable that the thiocyanate employed in producing the liquid coagulating bath be of the same kind as that used in forming the concentrated aqueous solution in which the acrylonitrile polymerization product is dissolved.

As the spinning solution is forced under pressure through the openings in the spinneret 14, it coagulates or precipitates in the form of solid, water-swollen or gelled filaments 26 upon entering the coagulating bath 22 which is maintained at a temperature not exceeding +10° C. by any suitable means, and preferably is maintained at or below 0° C., e. g., at —9° C. to —0.5° C. By using such a coagulating bath, coagulation takes place somewhat more gradually than when cold water alone is used as the liquid coagulant, other conditions being the same, thereby minimizing or obviating the formation of a dense skin on the surface of the individual filaments upon subsequent drying, with obvious disadvantages from the standpoint of ease of dyeing, etc.

The thiocyanate solution comprising the bath 22 may be refrigerated or cooled to the desired low temperature and circulated through the vessel 24, being introduced through the conduit 28 and withdrawn through the conduit 30. The maximum temperature of the coagulating bath 22 is critical, since at temperatures materially above +10° C., the resulting gelled fiber does not have sufficient toughness and ductility so that the fiber can be stretched adequately in order to orient the molecules along the fiber axis. Reference is made to the aforementioned Cresswell copending application Serial No. 772,200, for a more complete discussion on the matter of importance of the temperature of a coagulating bath when producing a synthetic fiber from a spinning solution of the kind used in practicing the present invention.

The coagulated fiber in gelled state is led through bath 22, which preferably is of the circulating type, by any suitable means. The gelled fiber may be led through the bath 22 merely with the aid of a guide or sheave 32 as is shown in the accompanying drawing. The gelled fiber 26 is then preferably washed by any suitable means until it is substantially free from thiocyanate. Thus the fiber may be washed using equipment such as is shown by way of illustration in the drawing. As there shown, the fiber 26 after leaving the liquid coagulating bath 22 passes over the revolving wheel or godet 34 into the wash water 36 containing in vessel 38 and thence over the guide roll or sheave 40. The wash water 36 is introduced into the vessel 38 through the conduit 42 and flows out of this vessel through the conduit 44. The wash water may be at any suitable temperature ranging, for example, from slightly above 0° C. to 20° or 30° C. In certain cases, for instance when a solution containing a low concentration (e. g., 3–5%) of thiocyanate is used and the coagulated fiber is retained in this solution for a relatively long period, then the wash water may be at higher temperatures of the order of 80° or 90° C. or more.

If the wash water is to be cooled, this may be done by circulating refrigerated water through the vessel 38, or the vessel 38 may be provided with suitable cooling coils whereby the water contained in, or circulating through, the vessel will be maintained at the desired low temperature. Ordinarily, water at from 0.5° C. to room temperature (20°–30° C.) can be used satisfactorily to wash the gelled fiber. A preferred method of washing the gelled fiber is on converging wash rolls whereby the fiber is advanced in a helical path over the rolls while applying a jet or jets of water to the advancing fiber. Such a method of washing is disclosed, for instance, in the copending application of Arthur Cresswell, Serial No. 73,078, filed January 27, 1949, now Patent No. 2,558,731, dated July 3, 1951, as well as in the copending application of Arthur Cresswell and Irvin Wizon, Serial No. 97,786, filed June 8, 1949, now Patent No. 2,558,733, dated July 3, 1951.

With further reference to the drawing, the washed fiber 46 after leaving the bath of wash water 36 passes over the revolving wheel or godet 48 and the auxiliary roller 50, being wrapped one or more (e. g., two or three) times about each, through the hot, aqueous, liquid medium 52, e. g., hot water, contained in the stretch trough 54, and thence over the godet 56 and the auxiliary roller 58, about each of which the fiber also is wrapped one or more (e. g., two or three) times. The godet 56 is caused to revolve at a peripheral speed greater than that of the godet 48; in other words, the surface speed of the godet 56 is such that the ratio of speeds of godets 48 and 56 is proportional to the desired stretch which is to be applied to the fiber as it passes through the hot, aqueous, liquid medium 40, which enters the stretch trough 54 through the conduit 60 and leaves through the conduits 62. A type of stretch trough which is suitable for use is disclosed and claimed in the copending application of Arthur Cresswell, Serial No. 146,880, filed February 28, 1950, now Patent No. 2,558,734, dated July 3, 1951.

After leaving the godet 56 the stretched or oriented gelled fiber 64 can be collected with other fibers produced from other spinning units into the form of a tow, which thereafter is cut into staple fiber length and subsequently processed to yield a crimped staple fiber, for instance as described in the copending application of Arthur Cresswell, Serial No. 87,592, filed April 15, 1949, now Patent No. 2,558,732, dated July 3, 1951, or by other suitable means. When a continuous filament yarn is to be produced, the subsequent processing operations preferably are carried out as described, for example, in the aforementioned copending application of Arthur Cresswell and Irvin Wizon, Serial No. 97,786.

In order that those skilled in the art may better understand how the present invention can be carried into effect, the following examples are given by way of illustration and not by way of limitation. All parts and percentages are by weight.

*Example 1*

This example illustrates the use of a liquid coagulating bath comprising an aqueous solution containing approximately 10% of sodium thiocyanate.

A solution of 36.42 kg. of 55.9% aqueous sodium thiocyanate and 2.06 kg. of water was cooled in a turbo-mixer to 9° C. The air above the solution was displaced with nitrogen, and 6.25 kg. of moist (34.5% water) acrylonitrile-methyl acrylate copolymer was added to the solution over a period of 1 minute by means of a Syntron feeder while the solution was stirred rapidly. (The copolymer was produced by polymerization in an aqueous solution of a mixture of 95% acrylonitrile and 5% methyl acrylate. The kinematic viscosity of a solution of 1 gram of the dry copolymer in 100 ml. of 60% aqueous sodium thiocyanate solution was 21.4 centipoises, which corresponds to an average molecular weight for the copolymer of approximately 75,000.) After all of the copolymer had been added, the mixer was again flushed with nitrogen and re-sealed. The mixing was carried on at slow speed for 24 hours at room temperature. The resulting solution of copolymer was then filtered in a plate-and-frame press at a flow rate of 1.09 gallons per square foot per hour. The filtered solution was stored under vacuum until bubble-free. The solution contained 48.7% sodium thiocyanate and 9.16% copolymer. Its viscosity, as determined by measuring the time for a Monel ball, ⅛ inch in diameter and weighing 0.142 gram, to fall through a 20-cm. column of the solution maintained at 61° C., was 17 seconds.

The above solution was spun into a fiber by continuously extruding it through a 40-hole spinneret with holes of 90 microns diameter into a coagulating bath comprising an aqueous solution containing approximately 10% of sodium thiocyanate. The coagulating bath was cooled to and maintained at a temperature of —2° C. The spinning solution was heated in a spinneret assembly immediately prior to extrusion to about 75°–80° C. by means of a heated portion within the assembly. The gelled filaments were led downwardly 4 inches to a submerged roller and then back to the surface of the coagulating bath, after which the unstretched, gelled thread was washed until substantially free from sodium thiocyanate. More particularly, washing was effected by leading the gelled thread to a pair of inclined wash rolls which converged slightly toward each other so that the thread would advance in a helical path from the feed-on end to the take-off end. On these wash rolls 37 feet of gelled thread in the form of advancing helices could be stored. As the helices advanced along the rolls, the thread was washed with water cooled to about 0° C. The washed, gelled thread was stretched 852% in water heated to 99° C., after which it was treated with a 2% solution of the diguanidinium salt of octadecylsulfosuccinate as an antistatic finish. After this treatment, the thread was continuously dried, heat-retracted 8.1% by passing it, while relaxed and free to contract linearly, through a slot heated to about 550° F., and then ring-twisted at a speed of 64–66 meters per minute. The properties of 78.5 denier yarn spun in this manner were as follows: tenacity, in grams per denier, 4.83 dry, 4.71 wet, 2.47 loop and 2.48 knot; elongation, 13% dry and 13.5% wet.

*Example 2*

This example illustrates the use of a liquid coagulating bath comprising an aqueous solution containing approximately 10% of calcium thiocyanate.

A solution of 36.40 kg. of 55.9% aqueous calcium thiocyanate and 3.72 kg. of water was cooled in a turbo-mixer to 9° C. The air above the solution was displaced with nitrogen, and 4.88 kg. of moist acrylonitrile-methyl acrylate copolymer of the kind described under Example 1 was added to the solution, dissolved, filtered and stored in the same manner described in that example. The solution contained 48.5% calcium thiocyanate and 7.38% copolymer. Its viscosity, determined as described under Example 1, was 18.8 seconds.

The above solution was spun into a fiber in essentially the same manner set forth under the preceding example with the exception that the solution was continuously extruded through the spinneret into a coagulating bath comprising an aqueous solution containing approximately 10% of calcium thiocyanate, the washed, gelled thread was stretched 855% in 99° C. water, and the percent to which the dried fiber was heat-retracted was 6.4%. The properties of 80.3 denier yarn spun in this manner were as follows: tenacity, in grams per denier, 5.12 dry, 4.85 wet, 2.55 loop and 2.43 knot; elongation, 13.5% dry and 12.5% wet.

*Example 3*

This example illustrates the use of a liquid coagulating bath comprising an aqueous solution containing approximately 20% of calcium thiocyanate.

A solution of 41.5 kg. of 54.5% aqueous calcium thiocyanate and 1 kg. of water was cooled in a turbo-mixer to 10° C. The air above the solution was displaced with nitrogen, and 7.5 kg. of moist (53.3% water) acrylonitrile-methyl acrylate copolymer of the kind described under Example 1 was added to the solution over a period of 1 minute by means of a Syntron feeder while the solution was stirred rapidly. The mixer was again flushed with nitrogen and re-sealed. The mixing was carried on at slow speed for 16 hours at 45° C. The resulting solution of copolymer was then filtered at 45° C. in a plate-and-frame press. The filtered solution was stored under vacuum until bubble-free. It contained 6.55% of copolymer, and its viscosity (determined as described under Example 1) was 23.4 seconds.

The above solution was spun into a fiber in essentially the same manner described under Example 1 with the following exceptions: A 40-hole spinneret having holes 120 microns in diameter was used, and the solution was continuously extruded through the spinneret into a coagulating bath comprising an aqueous solution containing approximately 20% of calcium thiocyanate. Also, the washed, gelled thread was stretched 600% in 99° C. water, and the continuously dried thread was heat-retracted 11% by passing it, while relaxed and free to contract linearly, through a slot heated to about 700° F. The properties of 114 denier yarn spun in this manner were as follows: tenacity, in grams per denier, 3.29 dry, 3.38 wet, 2.04 loop and 2.06 knot; elongation, 14% dry and 16% wet. As in the previous examples, the heat-treated yarn was led directly from a relaxation godet to a ring twister for twisting and continuous collection (in this case at 16 meters per minute) on a take-up spool or bobbin. In this particular example there was inserted approximately 10.0 turns per inch S twist into the yarn as it was being continuously collected.

*Example 4*

This example illustrates the use of a liquid coagulating bath comprising an aqueous solution containing 3 to 5% of calcium thiocyanate.

A solution of 6.2 kg. of 54.6% aqueous calcium thiocyanate and 198 g. of water was adjusted to a pH of 6.2. A slurry of 525 g. of dry acrylonitrile-methyl acrylate copolymer in 775 g. of water was added to this aqueous calcium thiocyanate solution with cooling. (The copolymer was produced by polymerization in an aqueous soluton of a mixture of 95% acrylonitrile and 5% methyl acrylate. The kinematic viscosity of a solution of 1 gram of the dry copolymer in 100 ml. of 60% aqueous sodium thiocyanate solution was 23.6 centipoises, which corresponds to an average molecular weight for the copolymer of approximately 83,000.) The batch was mixed for about 16 hours at room temperature, after which it was heated to 45° C. and filtered at that temperature in a plate-and-frame press. The filtered solution was stored under vacuum until bubble-free. Analysis of the solution after standing 11 days at room temperature showed that it contained 7.12% of copolymer, and its viscosity (determined as described under Example 1) was 27.6 seconds.

The above solution was spun into a fiber continuously by extruding it through a 40-hole spinneret with holes of 200 microns diameter into an aqueous coagulating bath consisting of an aqueous solution containing from 3 to 5% of calcium thiocyanate. The coagulating bath was cooled to and maintained at a temperature of between about —1° C. and about —0.5° C. The spinning solution was heated immediately prior to extrusion as described under Example 1. The coagulated fiber was carried back and forth through the bath at 2.24 meters per minute by means of a power-driven submerged godet positioned at one end of the bath and a set of free-running rollers at the other end. The total bath travel of the gelled fiber or thread was about 120 inches. The spun fiber was led out of the coagulating bath over guide rollers and a driven godet A through a trough containing water heated to about 99° C. The fiber was stretched 880% in this hot water by leading it over a second driven godet B, the peripheral speed of which was greater than that of the godet A. After applying a liquid composition containing an antistatic agent, the stretched fiber was dried continuously. The dried thread was heat-retracted 9% by passing it, while relaxed and free to contact linearly, through a slot heated to about 550° F., and was then ring-twisted at 17.6 meters per minute. The properties of 92 denier yarn spun in this manner were as follows: tenacity, in grams per denier, 3.72 dry and 3.80 wet; dry elongation, 16%.

*Example 5*

This example illustrates the use of a liquid coagulating bath comprising an aqueous solution containing 25% of calcium thiocyanate.

A solution of 5896 g. of 54.5% aqueous calcium thiocyanate solution was diluted with 614 g. of water, and the resulting solution was adjusted to a pH of 7.0 with hydrochloric acid. Four hundred and five (405) grams of dry acrylonitrile-methyl acrylate copolymer was dissolved in 5380 g. of the above calcium thiocyanate solution. (The copolymer was produced by polymerization in an aqueous solution of a mixture of 95% acrylonitrile and 5% methyl acrylate. The kinematic viscosity of a solution of 1 gram of the dry copolymer in 100 ml. of 60% aqueous sodium thiocyanate solution was 30.1 centipoises.) After filtration and deaeration, analysis of the solution showed that it contained 6.77% of copolymer. Its viscosity, determined as described under Example 1, was 87.2 seconds.

The above solution was extruded through a 40-hole spinneret, having openings 90 microns in diameter, into a 25% aqueous solution of calcium thiocyanate maintained at a temperature of about 4° C. The solution was extruded at a rate of 3384 cm. per minute. A complete bundle of filaments was readily collected and pulled away from the face of the spinneret at a speed of 6.75 meters per minute. The bundle was readily washed with water to remove the excess thiocyanate.

*Example 6*

This example illustrates the results obtained when effort is made to use a liquid coagulating bath comprising an aqueous solution containing a water-soluble thiocyanate in a concentration substantially above 25%, more particularly 30% and 40% solutions of calcium thiocyanate.

The spinning solution employed in this example was the same as that used in Example 5. When this solution was extruded through a 40-hole spinneret having openings 90 microns in diameter, into a 30% aqueous solution of calcium thiocyanate maintained at about 4° C., coagulation was so slow that a complete bundle of filaments could not be picked up, showing that the use of an aqueous coagulating bath containing 30% of calcium thiocyanate is not practical or feasible. When the same solution was similarly extruded into a 40% aqueous solution of calcium thiocyanate maintained at about 4° C., no coagulation whatsoever occurred.

It will be understood, of course, by those skilled in the art that our invention is not limited to the specific coagulating baths disclosed in the above illustrative examples. Thus, instead of using a liquid coagulating bath comprising an aqueous solution of sodium or calcium thiocyanate in a concentration of from about 3% to about 25%, by weight, we may use concentrated aqueous solutions of any other water-soluble thiocyanate in the aforementioned proportions. Numerous examples of water-soluble thiocyanates have been given hereinbefore.

Likewise, it will be understood by those skilled in the art that our invention is not limited to the specific polymerization product, namely, a copolymer of acrylonitrile and methyl acrylate, which is given in the illustrative examples. Thus, instead of this particular copolymer, we may use homopolymeric acrylonitrile or any other copolymer, more particularly a thermoplastic copolymer, of a major proportion of acrylonitrile and a minor proportion of another monomer or monomers, numerous examples of which latter also have been given hereinbefore. Furthermore, we are not limited to the particular proportions of copolymerizable monomers given in the examples. For instance, instead of using acrylonitrile and methyl acrylate in a weight ratio of 95% of the former to 5% of the latter in forming the copolymer or interpolymer we may use these and other copolymerizable ingredients including acrylonitrile in various other proportions, e. g., in a weight ratio of from about 55% to about 99% of acrylonitrile to from about 45% to about 1% of methyl acrylate, acrylamide, or other copolymerizable monomer or monomers, more particularly from, by weight, about 85% to about 95% of acrylonitrile to from about 15% to about 5% of methyl acrylate or other copolymerizable monomer or monomers.

The present invention provides numerous practical advantages, especially as compared with the use of water alone as a liquid coagulating bath. Specifically, the recovery of the solvent used in dissolving the acrylonitrile polymerization product is more economical by reason of the fact that there is less water to evaporate in producing a concentrated aqueous solution suitable for re-use as a solvent for the polymeric or copolymeric acrylonitrile. Another outstanding advantage results from the fact that the amount of refrigeration required for cooling the liquid coagulant is materially decreased, since there is no make-up water that has to be refrigerated as is the case when water alone is used as the aqueous coagulant and a bath temperature of, for example, +0.5° C. By thus decreasing the amount of refrigeration required, the process is made more economical.

Another advantage flowing from the invention is the fact that the thiocyanate reduces the freezing point of the coagulating bath and, therefore, makes possible the use of lower temperatures than can be obtained with water alone. Still another, valuable and unobvious advantage of the invention is that the use of our coagulating bath results in a somewhat more gradual precipitation or coagulation of the spinning solution than is possible with cold water alone (other conditions being the same), and thus minimizes or obviates the formation of a dense surface layer when the gelled fiber subsequently is dried. Such a dense surface layer has obvious disadvantages from the standpoint of ease of dyeability and lack of uniformity in the structure of the fiber.

The term "fiber" as used generically herein and in the appended claims is intended to include within its meaning both monofilaments and multifilaments.

We claim:

1. A method of forming shaped structures from an acrylonitrile polymerization product which comprises extruding an aqueous solution of an acrylonitrile polymerization product containing a major proportion by weight of combined acrylonitrile through a shaped orifice into a liquid coagulating bath comprising an aqueous solution containing from about 3% to about 25%, by weight, of a water-soluble thiocyanate which yields highly hydrated ions in an aqueous solution, said coagulating bath being at a temperature not exceeding +10° C. and said acrylonitrile polymerization product being dissolved in a concentrated aqueous solution of the same water-soluble thiocyanate which is a component of the said liquid coagulating bath.

2. A method as in claim 1 wherein the acrylonitrile polymerization product contains at least 85% by weight of combined acrylonitrile.

3. A method as in claim 1 wherein the water-soluble thiocyanate is sodium thiocyanate.

4. A method as in claim 1 wherein the water-soluble thiocyanate is calcium thiocyanate.

5. A method as in claim 1 wherein the liquid coagulating bath is at a temperature not exceeding about 0° C.

6. A method as in claim 1 wherein the liquid coagulating bath comprises an aqueous solution containing from about 5% to about 20%, by weight, of a water-soluble thiocyanate which yields highly hydrated ions in an aqueous solution.

7. A method of producing synthetic fibers from an acrylonitrile polymerization product which comprises extruding an aqueous solution of an acrylonitrile polymerization product containing a major proportion by weight of combined acrylonitrile through a shaped orifice into a liquid coagulating bath comprising an aqueous solution containing from about 5% to about 20%, by weight, of a water-soluble thiocyanate which yields highly hydrated ions in an aqueous solution, said coagulating bath being at a temperature not exceeding about 0° C. and said acrylonitrile polymerization product being dissolved in a concentrated aqueous solution of the same water-soluble thiocyanate which is a component of the said liquid coagulating bath; and washing the stretchable, gelled fiber which is precipitated in the said liquid coagulating bath.

8. A method of producing synthetic fibers from an acrylonitrile polymerization product which comprises extruding an aqueous solution of an acrylonitrile polymerization product containing at least 85% by weight of combined acrylonitrile through a shaped orifice into a liquid coagulating bath comprising an aqueous solution containing from about 5% to about 20%, by weight, of a water-soluble thiocyanate which yields highly hydrated ions in an aqueous solution, said coagulating bath being at a temperature below 0° C. and said acrylonitrile polymerization product being dissolved in a concentrated aqueous solution of the same water-soluble thiocyanate which is a component of the said liquid coagulating bath; washing the stretchable, gelled fiber which is precipitated in the said liquid coagulating bath until it is substantially free from thiocyanate; and stretching the washed, gelled fiber in the presence of moisture and at a temperature within the range of about 70° C. to about 110° C.

9. A method as in claim 8 wherein the liquid coagulating bath comprises an aqueous solution containing approximately 10° by weight of sodium thiocyanate.

10. A method of producing synthetic fibers from an acrylonitrile polymerization product which comprises extruding an aqueous solution of an acrylonitrile polymerization product containing a major proportion by weight of combined acrylonitrile through a shaped orifice into a liquid coagulating bath comprising an aqueous solution containing from about 5% to about 20%, by weight, of a water-soluble thiocyanate which yields highly hydrated ions in an aqueous solution, said coagulating bath being at a temperature of from about 0° C. to not exceeding +10° C. and said acrylonitrile polymerization product being dissolved in a concentrated aqueous solution of the same water-soluble thiocyanate which is a component of the said liquid coagulating bath; washing the stretchable, gelled fiber which is precipitated in the said liquid coagulating bath; and stretching the washed, gelled fiber in the presence of moisture and at a temperature within the range of about 70° C. to about 110° C.

11. A method as in claim 10 wherein the water-soluble thiocyanate is sodium thiocyanate.

References Cited in the file of this patent

UNITED STATES PATENTS

| | | |
|---|---|---|
| 1,465,994 | Palmer et al. | Aug. 28, 1923 |
| 2,004,271 | Dreyfus | June 11, 1935 |
| 2,025,730 | Dickie et al. | Dec. 31, 1935 |
| 2,140,921 | Rein | Dec. 20, 1938 |
| 2,420,565 | Rugeley et al. | May 13, 1947 |
| 2,558,730 | Cresswell | July 3, 1951 |
| 2,558,731 | Cresswell | July 3, 1951 |